United States Patent
Gaja et al.

(10) Patent No.: US 9,560,597 B2
(45) Date of Patent: Jan. 31, 2017

(54) BATTERY STATUS INDICATION WITHIN A WI-FI BEACON

(71) Applicant: QUALCOMM Incorporated, San Diego, CA (US)

(72) Inventors: Ajay Kumar Gaja, Hyderabad (IN); Rahul Jammula, Hyderabad (IN); Ankit Verma, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 14/617,728

(22) Filed: Feb. 9, 2015

(65) Prior Publication Data

US 2016/0234786 A1 Aug. 11, 2016

(51) Int. Cl.
*H04W 4/00* (2009.01)
*H04W 52/02* (2009.01)
*H04W 40/24* (2009.01)
*H04L 12/26* (2006.01)
*H04W 84/12* (2009.01)

(52) U.S. Cl.
CPC .......... *H04W 52/0261* (2013.01); *H04L 43/16* (2013.01); *H04W 40/244* (2013.01); *H04W 52/0206* (2013.01); *H04W 52/0235* (2013.01); *H04W 84/12* (2013.01)

(58) Field of Classification Search
None
See application file for complete search history.

(56) References Cited

U.S. PATENT DOCUMENTS

| 6,901,275 | B1 | 5/2005 | Aoyagi |
| 8,817,704 | B2 | 8/2014 | Ito et al. |
| 2002/0006805 | A1 | 1/2002 | New et al. |
| 2005/0156748 | A1 | 7/2005 | Lee |
| 2007/0249386 | A1 | 10/2007 | Bennett |
| 2009/0224909 | A1* | 9/2009 | Derrick ................. G01S 5/0027 340/539.13 |

(Continued)

FOREIGN PATENT DOCUMENTS

EP 2650692 A1 10/2013

OTHER PUBLICATIONS

Anonymous: "Manual-eng—mHotspot Monitor," Apr. 8, 2012, XP055260094, Retrieved from the Internet: URL: https://sites.google.com/site/picke2014/english-manual [retrieved on Mar. 21, 2016] Last change of the English manual based on Recent Site Activity of Google Sites was on: Apr. 8, 2012.

(Continued)

*Primary Examiner* — Anh-Vu Ly
(74) *Attorney, Agent, or Firm* — Paradice and Li LLP

(57) ABSTRACT

A method and apparatus are disclosed for transmitting battery status information within a Wi-Fi beacon from an access point. In some embodiments, a battery charge information element comprising battery status information may be included within a Wi-Fi beacon. In some other embodiments, the battery charge information element may be transmitted as part of a probe and response protocol. A station, in response to receiving the battery charge information element, may display a message to the user, search for another Wi-Fi network, or search for another network through a different network interface.

26 Claims, 7 Drawing Sheets

(56) References Cited

U.S. PATENT DOCUMENTS

| | | | |
|---|---|---|---|
| 2009/0280826 A1* | 11/2009 | Malik | H04M 1/7253 455/456.1 |
| 2010/0194632 A1 | 8/2010 | Raento et al. | |
| 2012/0013504 A1 | 1/2012 | Raento et al. | |
| 2012/0093117 A1 | 4/2012 | Suzuki et al. | |
| 2013/0059609 A1 | 3/2013 | Raento et al. | |
| 2013/0267245 A1* | 10/2013 | Shimizu | H04W 64/003 455/456.1 |
| 2014/0011543 A1* | 1/2014 | Li | H04W 52/0206 455/561 |
| 2014/0105172 A1 | 4/2014 | Daum | |
| 2014/0173447 A1 | 6/2014 | Das | |
| 2014/0226512 A1 | 8/2014 | Kosugi | |
| 2015/0085825 A1 | 3/2015 | Ishihara et al. | |
| 2015/0334676 A1 | 11/2015 | Hart et al. | |
| 2015/0358884 A1 | 12/2015 | Nagasaka et al. | |
| 2016/0029295 A1 | 1/2016 | Nagasaka et al. | |
| 2016/0157279 A1 | 6/2016 | Wang et al. | |
| 2016/0234778 A1* | 8/2016 | Gaja | H04W 52/0206 370/338 |

OTHER PUBLICATIONS

Anonymous: "mHotspot Monitor APP from Google Play," Apr. 15, 2012, XP055260217, Retrieved from the Internet: URL: https://sites.google.com/site/picke2014/system/app/pages/recentChanges [retrieved on Mar. 22, 2016] According to the snapshot taken above, the last update of this APP has occurred on Dec. 28, 2012.
Picke Communication: "MHotspot Monitor APP (Recent Site Activity)," Dec. 28, 2012, XP055260268, Retrieved from the Internet: URL: https://play.google.com/store/apps/details?id =jp.picke.hotspot/-Monitor&hl=en [retrieved on Mar. 22, 2016] the whole document.
International Search Report and Written Opinion—PCT/US2015/066522—ISA/EPO—Jul. 7, 2016.

* cited by examiner

BATTERY STATUS INDICATION WITHIN A WI-FI BEACON

TECHNICAL FIELD

The present embodiments relate generally to wireless communications, and specifically to including battery status information within a beacon frame.

BACKGROUND OF RELATED ART

A Wi-Fi network may be formed by one or more wireless devices. At least one of the wireless devices may operate as an access point (AP) or to create a hotspot (e.g., as a "soft" AP) to manage the Wi-Fi network. Within the Wi-Fi network, the AP may provide a wireless communication channel or link with a number of other wireless devices that may operate as stations (STAs) or client devices. The AP may periodically broadcast a beacon frame to enable STAs within wireless range of the AP to establish and/or maintain the wireless communication link with the AP.

Some wireless devices may be battery powered. If a wireless device is operating as an AP and depletes the charge of its associated battery (e.g., below a threshold value), the AP may turn off one or more components (e.g., one or more transceivers) and wireless communications within the Wi-Fi network may abruptly cease. Communications for STAs within the Wi-Fi network may be limited until the STAs locate and associate with another AP. Time sensitive network services such as financial transactions or data streaming may be adversely affected when the associated AP turns off (or enters a low power state). Thus, there is a need to improve wireless communications when battery powered wireless devices are used to form and/or maintain a wireless network.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A battery charge information element to be included within a beacon frame and a method of its broadcast to other wireless devices are disclosed. In one embodiment, a method for operating a first wireless device may include determining a battery charge of a battery associated with the first wireless device, creating a battery charge information element including at least an indication of the determined battery charge, and transmitting, using a transceiver of the first wireless device, a beacon frame including the battery charge information element. In another embodiment, a first wireless device may comprise a transceiver, a battery, a processor, and a memory storing instructions that, when executed by the processor, cause the first wireless device to: determine a battery charge of the battery, create a battery charge information element including at least an indication of the determined battery charge, and transmit, using a transceiver of the first wireless device, a beacon frame including the battery charge information element. For at least some embodiments, the battery charge information element may include a field storing one or more flag bits indicating the battery charge is greater than or not greater than one or more corresponding threshold values, may include a field storing a value indicating at least one of a remaining percentage of the battery charge or a depleted percentage of the battery charge or a combination thereof, and/or may include a field storing a value indicating a remaining operation time of the first wireless device based, at least in part, on the determined battery charge.

Further, if the second wireless device cannot decode the battery charge information element included in the beacon frame, the first wireless device may transmit, to the second wireless device, an action frame indicating the battery charge of the first wireless device. In addition, the first wireless device may also transmit an action frame to a second wireless device in response to the determined battery charge being less than a threshold value, the action frame instructing the second wireless device to switch its association from the first wireless device to another wireless device.

Other wireless devices receiving the battery charge information element may be alerted as to the first wireless device's battery level, and may take one or more suitable actions in response thereto. When the first wireless device serves as an AP, the one or more actions may include completing pending wireless communication operations with the first wireless device, locating and associating with another wireless device or AP, and/or selecting another network type or protocol.

In addition, for at least some embodiments, the first wireless device may conserve power consumption by reducing the output transmit power levels of its transceivers in response to the determined battery charge falling below a threshold value. The first wireless device may also cease adding new stations to a network managed by the first wireless device in response to the determined battery charge being less than a threshold value.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

Figure 1:
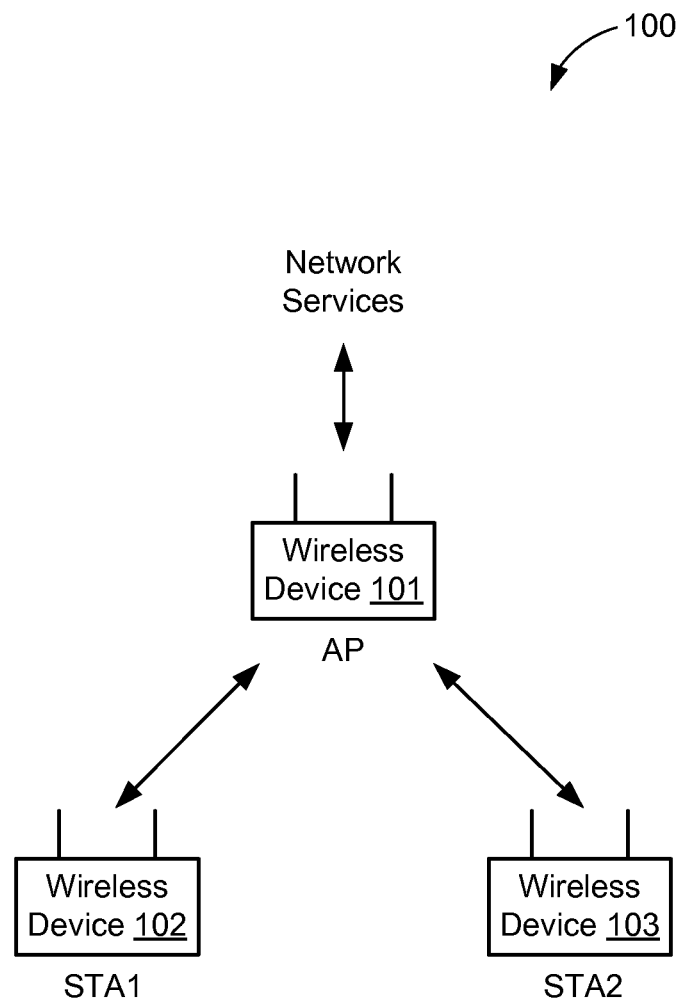
FIG. 1 depicts an example wireless network within which the present embodiments may be implemented.

The present embodiments are described below in the context of Wi-Fi enabled devices for simplicity only. It is to be understood that the present embodiments are equally applicable for devices using signals of other various wireless standards or protocols. As used herein, the terms "wireless local area network (WLAN)" and "Wi-Fi" can include communications governed by the IEEE 802.11 standards, BLUETOOTH®, HiperLAN (a set of wireless standards, comparable to the IEEE 802.11 standards, used primarily in Europe), and other technologies used in wireless communications. In addition, although described below in terms of a WLAN system including an AP and a plurality of STAs, the present embodiments are equally applicable to other WLAN systems including, for example, WLANs including a plurality of APs, peer-to-peer (or Independent Basic Service Set) systems, Wi-Fi Direct systems, and/or Hotspots. Thus, the term "AP" includes access points, soft APs, group owners (GOs), and any other device that manages and/or controls access to and/or the operation of a wireless network.

In addition, although described herein in terms of exchanging frames between wireless devices, the present embodiments may be applied to the exchange of any data unit, packet, and/or frame between wireless devices. Thus, the term "frame" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs. Further, the terms "sleep state" and "power save state" refer to a low-power operating mode in which one or more components of a Wi-Fi device or station are deactivated (e.g., to prolong battery life), and thus the terms "sleep state" and "power save state" may be used interchangeably herein.

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scope all embodiments defined by the appended claims.

FIG. 1 depicts an example wireless network 100 within which the present embodiments may be implemented. Wireless network 100 includes wireless devices 101-103. Other embodiments of wireless network 100 may include different numbers of wireless devices. At least one of the wireless devices 101-103 may operate as an access point (AP) to provide network services and manage wireless network 100. For the example of FIG. 1, wireless device 101 may function as the AP for wireless network 100. Wireless device 101, while serving as an AP, may operate according to the IEEE 802.11 family of standards (or according to other suitable wireless protocols). Thus, wireless device 101 may transmit beacon frames to enable other wireless devices to locate and associate with wireless device 101. Additionally, wireless device 101 may connect to network services (e.g., internet services) via a back-haul connection (e.g., a wireless link such a cellular communication link or a hardwired link such as an Ethernet, co-axial, or optical cable) to provide access to the network services for other wireless devices (e.g., for wireless devices 102-103) operating as client devices or stations (STAs). For example, wireless device 102 and wireless device 103 may operate as STAs and may associate with wireless device 101 to access the network services.

For at least some embodiments, wireless network 100 may be a peer-to-peer (P2P) network. The P2P network, which may also be referred to as an ad-hoc network, an independent basic service set (IBSS) network, or a Wi-Fi Direct network, may operate according to the IEEE 802.11 family of standards (or according to other suitable wireless protocols). For these at least some embodiments, wireless device 101 may be designated as the Group Owner (GO), and wireless devices 102-103 may be designated as P2P clients. As the GO, wireless device 101 may serve as a gateway (e.g., to another network) for the P2P clients, and may perform many of the functions as an AP (e.g., setting up and tearing down the P2P network, admitting new members to the P2P network, broadcasting beacon frames, and so on).

Wireless devices 101-103 may be any suitable Wi-Fi enabled mobile wireless devices including, for example, cell phones, personal digital assistants (PDAs), tablet devices, laptop computers, or the like. For at least some embodiments, wireless devices 101-103 may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIGS. 4-7.

The one or more transceivers may include Wi-Fi transceivers, Bluetooth transceivers, cellular transceivers, and/or other suitable radio frequency (RF) transceivers (not shown for simplicity) to transmit and receive wireless communication signals. Each transceiver may communicate with other wireless devices in distinct operating frequency bands and/or using distinct communication protocols. For example, the Wi-Fi transceiver may communicate within a 2.4 GHz frequency band and/or within a 5 GHz frequency band in accordance with the IEEE 802.11 specification. The cellular transceiver may communicate within various RF frequency bands in accordance with a 4G Long Term Evolution (LTE) protocol described by the 3rd Generation Partnership Project (3GPP) (e.g., between approximately 700 MHz and approximately 3.9 GHz) and/or in accordance with other cellular protocols (e.g., a Global System for Mobile (GSM) communications protocol). In other embodiments, the transceivers included within wireless devices 101-103 may be any technically feasible transceiver such as a ZigBee transceiver described by a specification from the ZigBee specification, a WiGig transceiver, and/or a HomePlug transceiver described a specification from the HomePlug Alliance.

Wireless device 101, operating as an AP, may periodically broadcast (e.g., transmit) a beacon frame to enable STAs to associate with and connect to wireless device 101. The beacon frames, which may include a traffic indication map (TIM) and timing synchronization function (TSF) values, are typically broadcast according to a target beacon transmission time (TBTT) schedule. Thus, the beacon frame broadcasts may be separated by a time interval known as the "beacon interval."

In some embodiments, wireless device 101 may be a battery powered device (e.g., a mobile STA) and may, in response to determining its battery charge, create a battery charge information element including battery charge information, remaining operation time, and/or other battery-related information. The battery charge information element may be embedded within or appended to the beacon frame, a probe response, or any other suitable management frame, action frame, and/or control frame. For at least one embodiment, the battery charge information element may be a vendor-specific information element. The battery charge may be determined using any suitable circuit or method. An example battery charge information element and an example beacon frame are described in more detail below in conjunction with FIG. 2.

Figure 2:
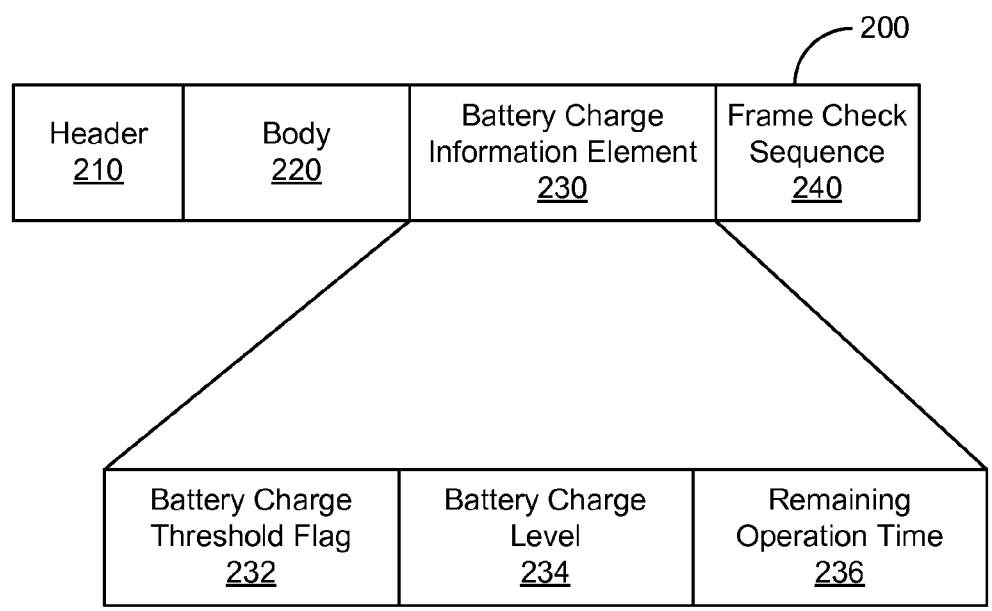
FIG. 2 shows a block diagram of a beacon frame including a battery charge information element, in accordance with some embodiments.

FIG. 2 shows an example frame format of a beacon frame 200, in accordance with some embodiments. Beacon frame 200 may include a header 210, a frame body 220, a battery charge information element 230, and a frame check sequence 240. In some embodiments, header 210 may be a media access control (MAC) header according to the IEEE 802.11 specification. For example, header 210 may include frame control information, frame duration information, and source and destination address information. Frame body 220 may include data, such as message payload data. Frame check sequence 240 may include information for detecting and correcting transmission and/or reception errors associated with beacon frame 200. For example, frame check sequence 240 may include cyclic redundancy check (CRC) data associated with data within beacon frame 200.

Battery charge information element 230 may include one or more fields storing information associated with a battery charge of the transmitting wireless device (e.g., wireless device 101). For example, battery charge information element 230 may include a battery charge threshold flag field 232, a battery charge level field 234, and/or a remaining operation time field 236. The battery charge threshold flag field 232 may store one or more flag bits indicating whether the battery charge of wireless device 101 is greater than (or not greater than) one or more corresponding threshold values. In some embodiments, values of the one or more battery charge flag bits may indicate whether the battery charge is greater than (or not greater than) one or more corresponding predetermined battery charges of the wireless device. For example, a first flag bit of battery charge threshold flag field 232 may indicate (e.g., when asserted to logic high) that the battery charge is greater than 50% of the maximum battery charge, a second flag bit of battery charge threshold flag field 232 may indicate (e.g., when asserted to logic high) that the battery charge is greater than 40% of the maximum battery charge, and so on. For such embodiments, un-asserted flag bits may indicate that the battery charge is not greater than the corresponding predetermined battery charge.

In other embodiments, the flag bits of the battery charge threshold flag field 232 may indicate a battery charge greater than (or alternately, less than) any technically feasible percentage of the maximum battery charge. In still other embodiments, values for the flag bits of battery charge threshold flag field 232 may remain at zero until the battery charge crosses or becomes equal to a threshold value. For example, the flag bits of battery charge threshold flag field 232 may be in a form of 0x0 until the battery charge is less than 50%. Table 1, shown below, illustrates possible flag bit values for battery charge threshold flag field 232 and corresponding remaining battery charge percentages.

TABLE 1

| Battery Charge Threshold Flag Value | Remaining Charge of Battery |
| --- | --- |
| 0x0 | 100%-51% |
| 0x01 | 50%-41% |
| 0x02 | 40%-31% |
| ... | ... |
| 0xn | 5% or less |

Battery charge level field 234 may include values or information indicating a percentage of the remaining and/or depleted battery charge of the wireless device. Thus, while the battery charge threshold flag field 232 may store one or more values indicating whether the battery charge is greater than (or not greater than) one or more predetermined battery charge levels or percentages, the battery charge level field 234 may store a value indicating the actual battery charge or percentage of battery charge. For example, the value stored in battery charge level field 234 may indicate a remaining charge of 50%, 40%, or any other percentage of full battery charge.

The remaining operation time field 236 may store values indicating a remaining battery charge in terms of remaining operation time of the wireless device. For example, remaining operation time field 236 may store values indicating that the wireless device 101 has enough remaining battery power to operate (e.g., to maintain the wireless link associated with the network 100 of FIG. 1) for a given number N of minutes before wireless device 101 begins to shut down (e.g., and terminate the wireless link). For other embodiments, any other technically feasible battery information may be included within battery charge information element 230.

In addition to creating battery charge information element 230 in response to its determined battery charge, wireless device 101 may perform one or more operations based on its determined battery charge. Details regarding these operations are described below in conjunction with FIGS. 4 and 5. A wireless device receiving beacon frame 200 may perform one or more operations based on battery charge information element 230 contained therein. Details regarding these operations are described below in conjunction with FIGS. 6 and 7.

Figure 3:
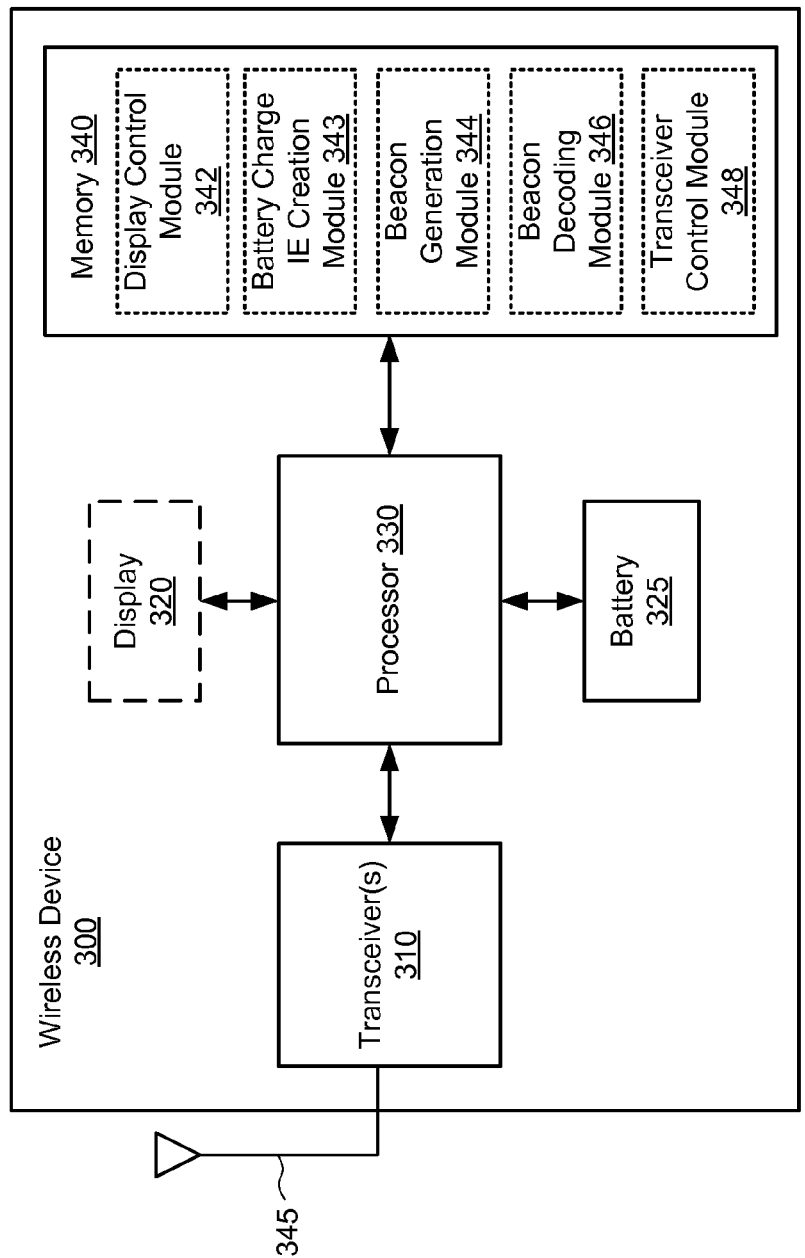
FIG. 3 shows a wireless device that is one embodiment of the wireless devices of FIG. 1.

FIG. 3 shows a wireless device 300 that is one embodiment of wireless devices 101-103 of FIG. 1. Wireless device 300 includes one or more transceivers 310, a processor 330, a battery 325, a memory 340, a number of antennas 345 (only one antenna shown for simplicity), and an optional display 320 (shown with dashed lines). The one or more transceivers 310 may be used to transmit signals to and receive signals from other wireless devices. In some embodiments, transceiver(s) 310 may include multiple transceivers to transmit and receive signals within different frequency bands and/or according to different protocols. For example, a first of transceivers 310 may transmit and receive Wi-Fi signals, a second of transceivers 310 may transmit and receive cellular signals, and a third of transceivers 310 may transmit and receive Bluetooth signals. The one or more transceivers 310 may also transmit beacon frame 200 (and other suitable frames). Battery 325 may supply power to all or part of wireless device 300. Display 320, when available, may display status information, and/or may provide a user interface for a user of device 300.

Memory 340 may include a non-transitory computer-readable storage medium (e.g., one or more nonvolatile memory elements, such as EPROM, EEPROM, Flash memory, a hard drive, etc.) that may store the following software modules:

- a display control module 342 to control display 320;
- a battery charge information element (IE) creation module 343 to create the battery charge information element 230 based on the determined battery charge of wireless device 300;
- a beacon generation module 344 to generate beacon frame 200 for transmission by the one or more transceivers 310;
- a beacon decoding module 346 to decode beacon frames 200 received by the one or more transceivers 310 from another wireless device; and
- a transceiver control module 348 to control transmissions and receptions by the one or more transceivers 310 and/or to control the output transmit power of the one or more transceivers 310.

Each software module includes program instructions that, when executed by processor 330, may cause the wireless device 300 to perform the corresponding function(s). Thus, the non-transitory computer-readable storage medium of memory 340 may include instructions for performing all or a portion of the operations of FIGS. 4, 5, 6, and/or 7.

Processor 330, which is coupled to transceivers 310, battery 325, memory 340, and display 320, may be any one or more suitable processors capable of executing scripts or instructions of one or more software programs stored in wireless device 300 (e.g., within memory 340). Although not shown for simplicity, processor 330 may include any suitable device or circuitry to determine the battery charge of battery 325. For example, processor 330 may include an analog-to-digital converter (ADC) to measure a voltage of battery 325. Processor may also include circuits to that interface with display 320. The resulting battery charge information may be provided to transceivers 310 and/or memory 340 by processor 330.

Processor 330 may execute display control module 342 to display messages (including text and/or images) on display 320. For example, in response to determined battery charge levels of battery 325, processor 330 may cause a low battery warning message to be displayed on display 320. Any technically feasible message may be shown on display 320 in response to any determined battery charge level of battery 325.

Processor 330 may execute battery charge information element creation module 343 to create the battery charge information element 230 based on the determined battery charge of wireless device 300.

Processor 330 may execute beacon generation module 344 to create or generate beacon frame 200. For example, processor 330 may determine a charge associated with battery 325, create battery charge information element 230 to include values for one or more of battery charge threshold flag field 232, battery charge level field 234, and remaining operation time field 235, and embed the battery charge information element 230 within beacon frame 200.

Processor 330 may execute beacon decoding module 346 to decode some or all elements included in a received beacon frame 200 (e.g., from another wireless device operating as an AP or GO). For example, transceiver 310 may receive beacon frame 200. Processor 330 may decode the received beacon frame 200 and determine battery charge information of the other wireless device based on the received battery charge information element 230.

Processor 330 may execute transceiver control module 348 to transmit and receive wireless communications via transceiver 310. In some embodiments, processor 330 may transmit beacon frame 200 generated by beacon generation module 344 via transceiver 310. In other embodiments, processor 330 may receive beacon frame 200 via transceiver 310. In still other embodiments, processor 330 may connect to (e.g., associate and/or authenticate with) a wireless device and/or AP via transceiver 310.

In addition, processor 330 may adjust the output transmit power of the one or more transceivers 310 (e.g., to reduce power consumption) in response to the determined battery charge.

Figure 4:
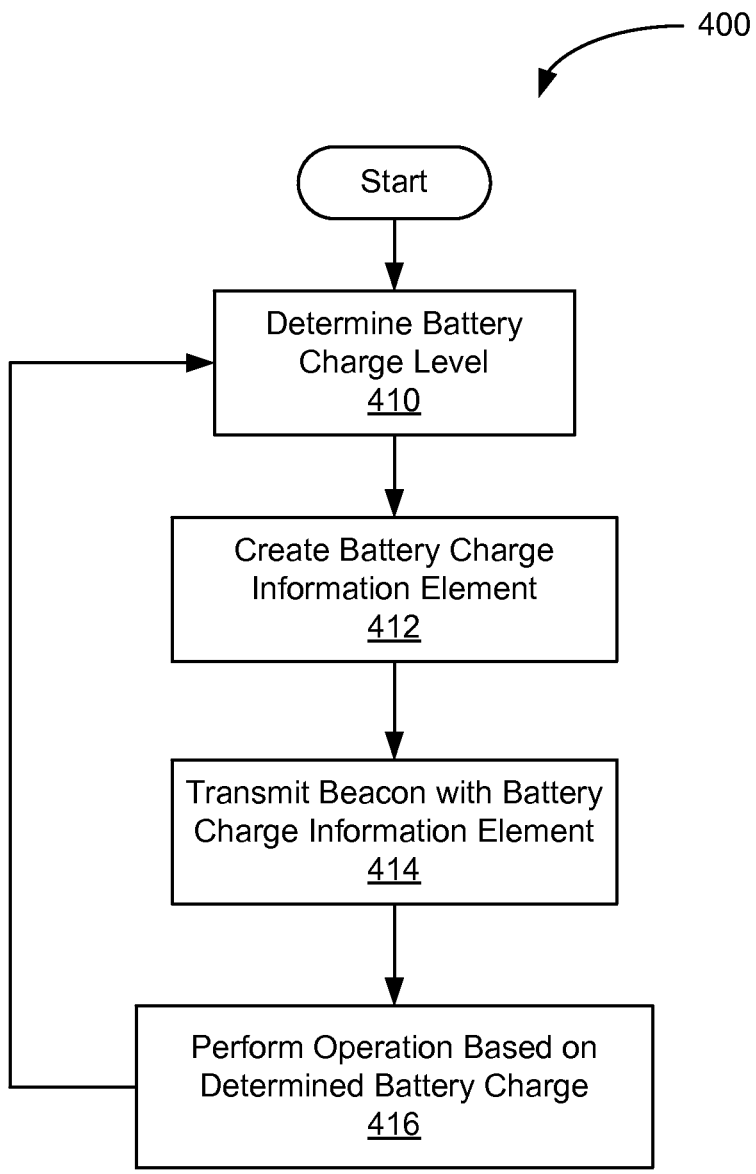
FIG. 4 shows an illustrative flow chart depicting an example operation for transmitting a beacon frame in accordance with some embodiments.

FIG. 4 shows an illustrative flow chart depicting an example operation 400 for transmitting a beacon frame 200 from wireless device 300, in accordance with some embodiments. Referring also to FIGS. 2 and 3, a battery charge of battery 325 is determined (410). For example, processor 330 may determine the battery charge of battery 325 by using an ADC to measure a voltage associated with battery 325 (although other circuits and/or techniques may be used to determine the battery charge). Next, wireless device 300 may create a battery charge information element 230 (412). For example, wireless device 300 may populate battery charge threshold flag field 232, battery charge level field 234, and/or remaining operation time field 326 of the battery charge information element 230 with suitable values based on the determined battery charge. Next, wireless device 300 may transmit beacon frame 200 including the battery charge information element 230 using the one or more transceivers 310 (414). For example, wireless device 300 may embed battery charge information element 230 (determined at 412) within beacon frame 200 (or may append battery charge information element 230 to beacon frame 200).

Beacon frame 200 may then be transmitted by the one or more transceivers 310 to other wireless devices. Wireless device 300 may also perform one or more operations based on the determined battery charge (416). For one example, wireless device 300 may reduce the transmit power of its one or more transceivers 310 (e.g., when the determined battery charge falls below a threshold value or when the remaining operation time of wireless device 300 falls below a threshold time value). For another example, wireless device 300 may send an action frame, including battery charge information, to another wireless device to alert the other wireless device as to the battery charge level of wireless device 300. The action frame may also include an instruction for the second wireless device to switch its association from the first wireless device to another wireless device. Operations may proceed to 410.

Figure 5:
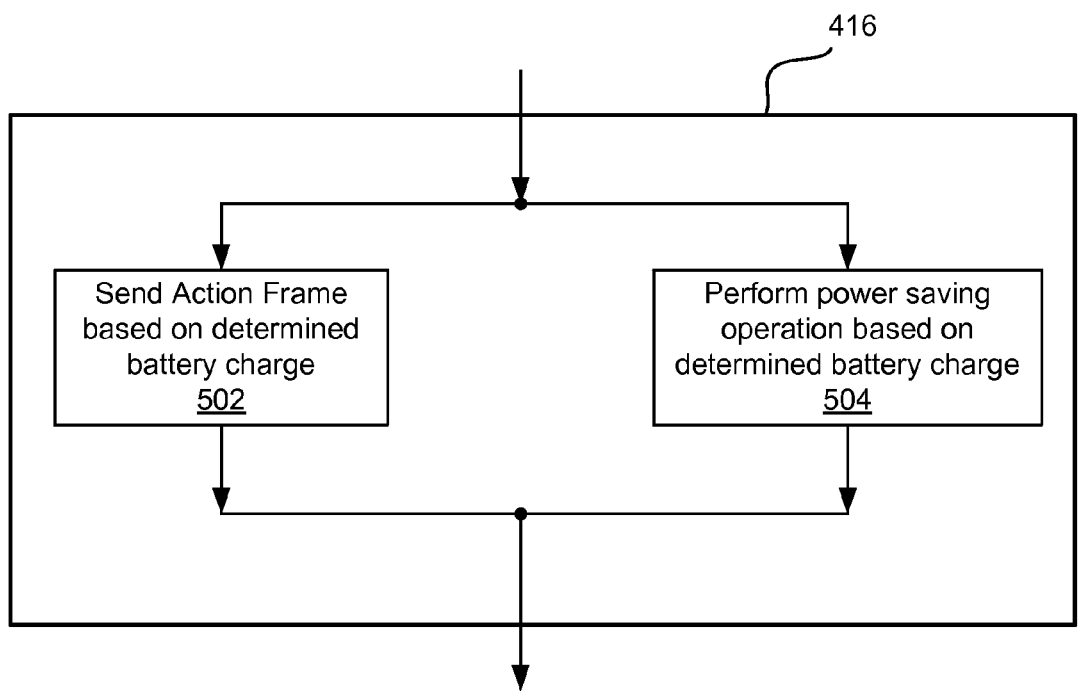
FIG. 5 shows an illustrative flow chart depicting details for performing operations based on a determined battery charge, in accordance with some embodiments.

FIG. 5 shows an illustrative flow chart depicting example operations that may be performed by wireless device 300 based on the battery charge of its battery 325 (FIG. 4, 416), in accordance with some embodiments. Operations shown in FIG. 5 may be performed in parallel or in series, and may be performed singularly or in combination. In some embodiments, an action frame may be transmitted based on the determined battery charge of wireless device 300 (502). For example, the action frame may be transmitted when the battery charge percentage is less than, greater than, or equal to a threshold value, when the battery charge level is less than, greater than, or equal to a threshold value, and/or when the remaining operation time is less than, greater than, or equal to a threshold value. The action frame may indicate a percentage of battery charge of wireless device 300, a battery charge level of wireless device 300, and/or a remaining operation time of wireless device 300. In this manner, the action frame may provide information associated with a battery charge of wireless device 300 to another wireless device (e.g., a receiving device).

The action frame may also include an instruction for the second wireless device to switch its association from the first wireless device to another wireless device. For embodiments in which the action frame indicates that wireless device 300 may shutdown within an indicated time period (e.g., due to a low battery condition), the receiving device may prepare for the shutdown by searching for (e.g., scanning) and associating with another AP before the wireless link provided by wireless device 300 is terminated due to a low battery condition.

In some embodiments, the action frame may be transmitted to a receiving device that may not be able to decode the battery charge information element 230 embedded within the beacon frame 200 and/or within a probe response. For example, if the receiving device cannot decode the battery charge information element 230 embedded within the beacon frame or the probe response, the receiving device may indicate to wireless device 300 that the battery charge information element 230 cannot be decoded. In response thereto, wireless device 300 may store the MAC address (or other identifying information) of the receiving device, and thereafter may send, to the receiving device, an action frame (e.g., or some other suitable unicast frame) including battery charge information of the wireless device 300.

In some embodiments, the wireless device 300 may perform one or more power saving operations based on the determined battery charge (504). For example, when the battery charge level or percentage falls below a threshold value, or when the remaining operation time falls below a threshold value, the wireless device 300 may reduce an output transmit power of its transceivers 310 or may cease accepting new STAs for a network managed by wireless device 300. In some other embodiments, other technically feasible power saving operations may be performed such as, for example, shutting down idle software applications, turning off unused hardware accessories, and/or powering down wireless device 300. Although only two example operations 502 and 504 are described above, in other embodiments, any other technically feasible operations may be performed by wireless device 300 based on its determined battery charge.

Figure 6:
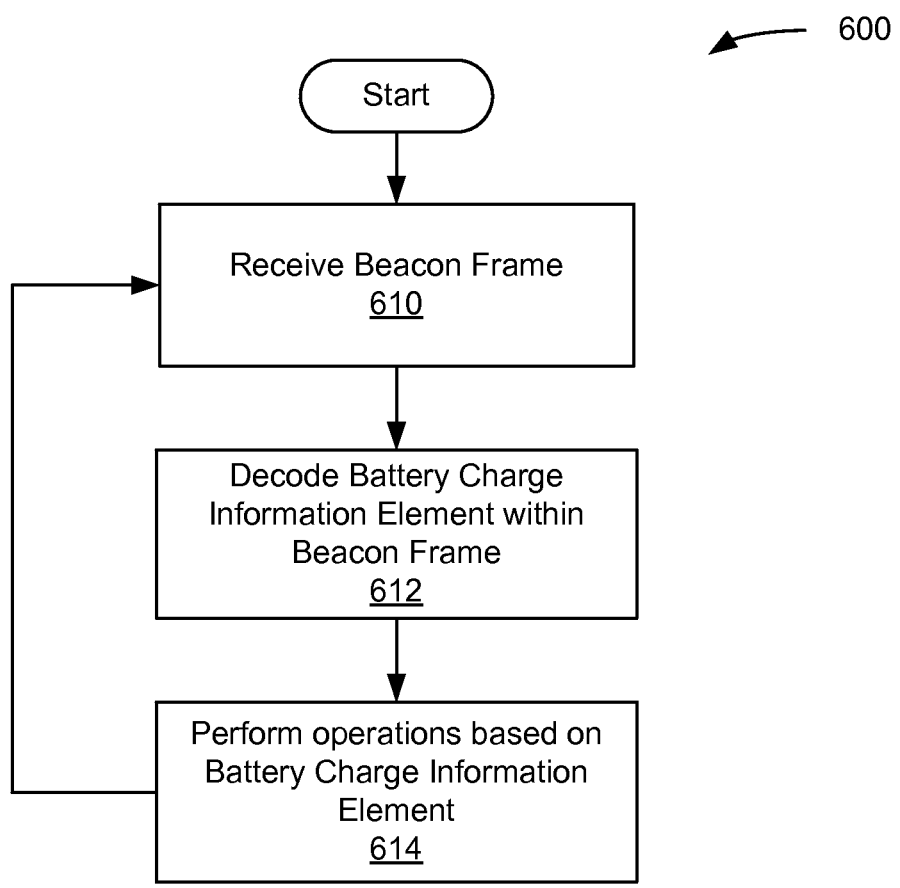
FIG. 6 shows an illustrative flow chart depicting an example operation for receiving a beacon frame, in accordance with some embodiments.

FIG. 6 shows an illustrative flow chart depicting an example operation 600 for receiving, by wireless device 300, a beacon frame 200 including a battery charge information element 230, in accordance with some embodiments. Referring also to FIGS. 2 and 3, a beacon frame 200 including battery charge information element 230 may be received by wireless device 300 while acting as a client device or STA (610). For example, wireless device 300 may receive the beacon frame 200 from an associated AP through transceiver 310. Next, wireless device 300 may decode battery charge information element 230 included within beacon frame 200 (612). For example, wireless device 300 may decode battery charge information element 230 and determine the battery charge level or battery charge percentage of the associated AP. Next, the wireless device 300 may perform one or more operations based on the received battery charge information element 230 (614). For example, wireless device 300 may display a message to a user, search for another Wi-Fi network or AP, or perform other operations based on battery charge information element 230. Example operations that may be performed based on a received battery charge information element 230 are described in detail below in conjunction with FIG. 7. Operations may proceed to 610.

Figure 7:
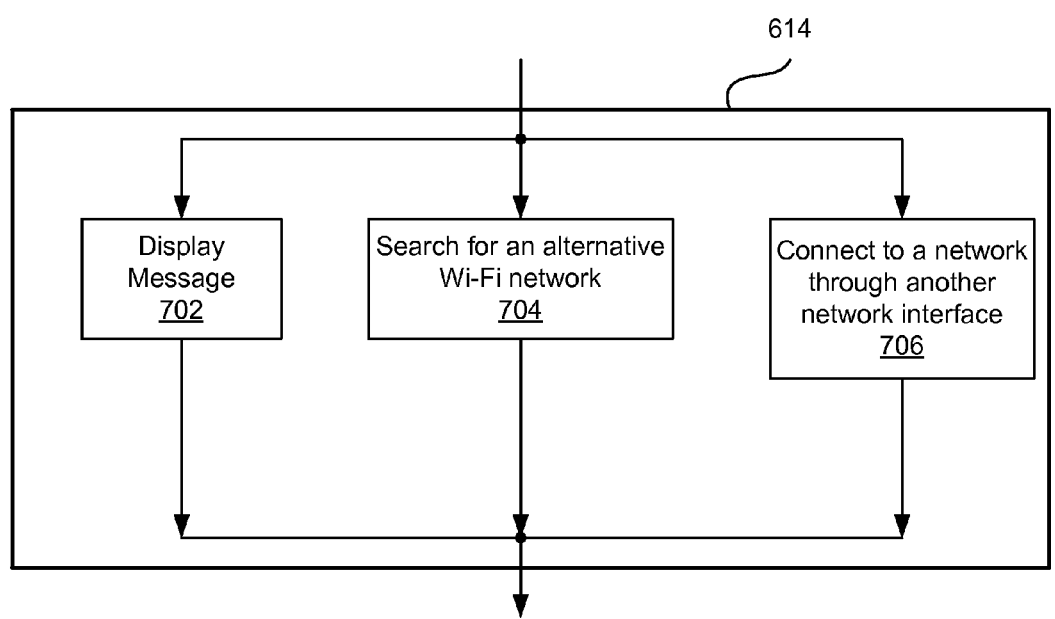
FIG. 7 shows an illustrative flow chart depicting details for performing operations based on a received battery charge information element, in accordance with some embodiments.

FIG. 7 shows an illustrative flow chart depicting example operations that may be performed by wireless device 300 based on battery charge information element 230 received from another wireless device acting as an AP or as a GO (FIG. 6, 614), in accordance with some embodiments. Operations shown in FIG. 7 may be performed in parallel or in series, and may be performed singularly or in combination. In some embodiments, a message may be displayed on display 320 associated with wireless device 300 (702). For example, a message to a user may be displayed on display 320 to indicate that the associated AP may shutdown within a determined time period. In some embodiments, the time period may be indicated by battery charge information element 230. In another example, display 320 may prompt the user to search for and select an alternative AP. In yet another example, display 320 may show a countdown of a remaining operation time of the associated AP (e.g., for which the wireless link provided thereby may remain active).

In some embodiments, wireless device 300 may search for an alternative Wi-Fi network (704). For example, in response to battery charge information element 230, wireless device 300 may begin to scan for an alternative Wi-Fi network to associate with when a currently associated AP is to become unavailable. In some embodiments, when battery charge information element 230 indicates that a battery charge of the current AP is less than a threshold, then wireless device 300 may begin to scan for the alternative Wi-Fi network. In some other embodiments, wireless device 300 may complete any pending wireless communication operations prior to scanning for the alternative Wi-Fi network. If an alternative Wi-Fi network is located, wireless device 300 may establish a new network connection with the alternative Wi-Fi network prior to the wireless link provided by the other wireless device becoming unavailable.

In some embodiments, wireless device 300 may connect to a network through a different transceiver (706). For example, wireless device 300 may include a Wi-Fi transceiver and a cellular transceiver. Wireless device 300 may be connected to a first network through the Wi-Fi transceiver. In response to battery charge information element 230, wireless device 300 may connect to a second network through the cellular transceiver. In some embodiments, wireless device 300 may complete any pending wireless communication operations associated with the Wi-Fi transceiver prior to connecting to the second network associated with the cellular transceiver. Although only three example operations 702, 704, and 706 are described above, in other embodiments, any other technically feasible operations may be performed by wireless device 300 based on battery charge information element 230.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method of operating a first wireless device as an access point, the method comprising:
   determining a battery charge of a battery associated with the first wireless device; and
   transmitting, using a transceiver of the first wireless device, a beacon frame containing a battery charge information element including at least an indication of the battery charge, wherein the battery charge information element comprises a field storing one or more flag bits indicating the battery charge is greater than or not greater than one or more corresponding threshold values.

2. The method of claim 1, wherein the battery charge information element comprises one or more fields storing one or more values indicating a remaining percentage of the battery charge or a depleted percentage of the battery charge or a combination thereof.

3. The method of claim 1, wherein the battery charge information element comprises a field storing a value indicating a remaining operation time of the first wireless device based, at least in part, on the determined battery charge.

4. The method of claim 1, further comprising:
transmitting an action frame to a second wireless device in response to the determined battery charge being less than a threshold value, the action frame instructing the second wireless device to switch its association from the first wireless device to another wireless device.

5. The method of claim 1, further comprising:
transmitting an action frame to a second wireless device based, at least in part, on determining the second wireless device cannot decode the battery charge information element contained in the beacon frame, the action frame indicating the battery charge of the first wireless device.

6. The method of claim 1, further comprising:
reducing an output transmit power of the first wireless device in response to the battery charge being less than a threshold value.

7. The method of claim 1, further comprising:
ceasing to add new stations to a network managed by the first wireless device in response to the determined battery charge being less than a threshold value.

8. A first wireless device, comprising:
a transceiver;
a battery;
a processor coupled to the transceiver and the battery; and
a memory storing instructions that, when executed by the processor, cause the first wireless device to:
determine a battery charge of the battery; and
transmit, using a transceiver of the first wireless device, a beacon frame containing a battery charge information element including at least an indication of the battery charge, wherein the battery charge information element comprises a field storing one or more flag bits indicating the battery charge is greater than or not greater than one or more corresponding threshold values.

9. The first wireless device of claim 8, wherein the battery charge information element comprises one or more fields storing one or more values indicating a remaining percentage of the battery charge or a depleted percentage of the battery charge or a combination thereof.

10. The first wireless device of claim 8, wherein the battery charge information element comprises a field storing a value indicating a remaining operation time of the first wireless device based, at least in part, on the determined battery charge.

11. The first wireless device of claim 8, wherein execution of the instructions further causes the first wireless device to:
transmit an action frame to a second wireless device in response to the determined battery charge being less than a threshold value, the action frame instructing the second wireless device to switch its association from the first wireless device to another wireless device.

12. The first wireless device of claim 8, wherein execution of the instructions further causes the first wireless device to:
transmit an action frame to a second wireless device based, at least in part, on determining the second wireless device cannot decode the battery charge information element contained in the beacon frame, the action frame indicating the battery charge of the first wireless device or instructing the second wireless device to switch association.

13. The first wireless device of claim 8, wherein execution of the instructions further causes the first wireless device to:
reduce an output transmit power of the first wireless device in response to the battery charge being less than a threshold value.

14. The first wireless device of claim 8, wherein execution of the instructions further causes the first wireless device to:
cease to add new stations to a network managed by the first wireless device in response to the determined battery charge being less than a threshold value.

15. A non-transitory computer-readable medium containing program instructions that, when executed by a processor of a first wireless device operating as an access point, causes the first wireless device to perform operations comprising:
determining a battery charge of a battery of the first wireless device; and
transmitting, using a transceiver of the first wireless device, a beacon frame containing a battery charge information element including at least an indication of the battery charge, wherein the battery charge information element comprises a field storing one or more flag bits indicating the battery charge is greater than or not greater than one or more corresponding threshold values.

16. The non-transitory computer-readable medium of claim 15, wherein the battery charge information element comprises one or more fields storing one or more values indicating a remaining percentage of the battery charge or a depleted percentage of the battery charge or a combination thereof.

17. The non-transitory computer-readable medium of claim 15, wherein the battery charge information element comprises a field storing a value indicating a remaining operation time of the first wireless device based, at least in part, on the determined battery charge.

18. The non-transitory computer-readable medium of claim 15, wherein execution of the instructions further causes the first wireless device to:
transmit an action frame to a second wireless device in response to the determined battery charge being less than a threshold value, the action frame instructing the second wireless device to switch its association from the first wireless device to another wireless device.

19. The non-transitory computer-readable medium of claim 15, wherein execution of the instructions further causes the first wireless device to:
transmit an action frame to a second wireless device based, at least in part, on determining the second wireless device cannot decode the battery charge information element contained in the beacon frame, the action frame indicating the battery charge of the first wireless device.

20. The non-transitory computer-readable medium of claim 15, wherein execution of the instructions further causes the first wireless device to:
reduce an output transmit power of the first wireless device in response to the battery charge being less than a threshold value.

21. The non-transitory computer-readable medium of claim 15, wherein execution of the instructions further causes the first wireless device to:

cease to add new stations to a network managed by the first wireless device in response to the determined battery charge being less than a threshold value.

22. A first wireless device, comprising:

means for determining a battery charge of a battery associated with the first wireless device; and means for transmitting, using a transceiver of the first wireless device, a beacon frame containing a battery charge information element including at least an indication of the battery charge, wherein the battery charge information element comprises a field storing one or more flag bits indicating the battery charge is greater than or not greater than one or more corresponding threshold values.

23. The first wireless device of claim 22, wherein the battery charge information element comprises one or more fields storing one or more values indicating a remaining percentage of the battery charge or a depleted percentage of the battery charge or a combination thereof.

24. The first wireless device of claim 22, wherein the battery charge information element comprises a field storing a value indicating a remaining operation time of the first wireless device based, at least in part, on the determined battery charge.

25. The first wireless device of claim 22, further comprising:

means for transmitting an action frame to a second wireless device in response to the determined battery charge being less than a threshold value, the action frame instructing the second wireless device to switch its association from the first wireless device to another wireless device.

26. The first wireless device of claim 22, further comprising:

means for reducing an output transmit power of the first wireless device in response to the battery charge being less than a threshold value.

* * * * *